US012605800B2

(12) United States Patent (10) Patent No.: US 12,605,800 B2

Ohata (45) Date of Patent: Apr. 21, 2026

(54) DISTANCE MEASUREMENT DEVICE, DISTANCE MEASUREMENT METHOD, AND MACHINE TOOL

(71) Applicant: Mitsubishi Electric Corporation, Tokyo (JP)

(72) Inventor: Nobuo Ohata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 549 days.

(21) Appl. No.: 17/985,972

(22) Filed: Nov. 14, 2022

(65) Prior Publication Data

US 2023/0076436 A1 Mar. 9, 2023

Related U.S. Application Data

(63) Continuation of application No. PCT/JP2020/028411, filed on Jul. 22, 2020.

(51) Int. Cl.
B23Q 17/24 (2006.01)
G01B 9/02 (2022.01)
(Continued)

(52) U.S. Cl.
CPC .......... B23Q 17/2471 (2013.01); G01B 11/14 (2013.01); G01B 11/2441 (2013.01);
(Continued)

(58) Field of Classification Search
CPC ................ B23Q 17/2471; G01B 11/14; G01B 11/2441; G01B 9/02004; G01B 9/0209;
(Continued)

(56) References Cited

U.S. PATENT DOCUMENTS

2018/0224548 A1* 8/2018 Hariyama .......... G01B 9/02007
2021/0199424 A1 7/2021 Goto et al.
2022/0334254 A1* 10/2022 Ueno .................... G01S 7/4915

FOREIGN PATENT DOCUMENTS

CN 103090806 A * 5/2013 ......... G01B 9/02004
CN 110646805 A * 1/2020 ............. G01S 17/32
(Continued)

OTHER PUBLICATIONS

International Search Report for PCT/JP2020/028411(PCT/ISA/210) mailed on Sep. 8, 2020.
(Continued)

*Primary Examiner* — Lisa M Caputo
*Assistant Examiner* — Christian T Bryant
(74) *Attorney, Agent, or Firm* — Birch, Stewart, Kolasch & Birch, LLP

(57) ABSTRACT
A distance measurement device includes: a signal acquisition unit to acquire an electric signal based on interference light from an optical sensor device that splits sweep light having a periodically changing frequency into reference light and irradiation light to be emitted toward an object to be measured, irradiates the object with the irradiation light, generates interference light by causing the reference light to interfere with reflected light that is the irradiation light reflected by the object, and generates the electric signal based on the generated interference light; a frequency calculation unit to calculate, on the basis of the electric signal based on the interference light, a peak frequency of the electric signal using LASSO regression; a distance measurement unit to measure, on the basis of the peak frequency, a distance from a predetermined reference point to the object; and a distance output unit to output distance information indicating the distance.

7 Claims, 8 Drawing Sheets

(51) Int. Cl.

| | |
|---|---|
| *G01B 9/02004* | (2022.01) |
| *G01B 9/0209* | (2022.01) |
| *G01B 11/00* | (2006.01) |
| *G01B 11/02* | (2006.01) |
| *G01B 11/14* | (2006.01) |
| *G01B 11/24* | (2006.01) |
| *G06F 17/18* | (2006.01) |

(52) U.S. Cl.
CPC ...... *G01B 9/02004* (2013.01); *G01B 9/02083* (2013.01); *G01B 9/0209* (2013.01); *G01B 11/00* (2013.01); *G01B 11/02* (2013.01); *G01B 11/026* (2013.01); *G06F 17/18* (2013.01)

(58) Field of Classification Search
CPC .. G01B 9/02083; G01B 11/026; G01B 11/00; G01B 11/02; G01S 7/4917; G01S 17/34; G01S 17/88; G06F 17/18
See application file for complete search history.

(56) References Cited

FOREIGN PATENT DOCUMENTS

| | | | | |
|---|---|---|---|---|
| JP | 2018084434 A | * | 5/2018 | |
| JP | 6576594 B1 | | 9/2019 | |
| WO | WO-2018235160 A1 | * | 12/2018 | ............. G01S 17/32 |
| WO | WO 2020/070884 A1 | | 4/2020 | |

OTHER PUBLICATIONS

Written Opinion of the International Searching Authority for PC.T/JP2020/028411(PCT/ISA/237) mailed on Sep. 8, 2020.

Robert Tibshirani, "Regression Shrinkage and Selection via the Lasso" Journal of the Royal Statistical Society. Series B (Methodological) , 1996, vol. 58, No. 1, pp. 267-288.

Chinese Office Action and Search Report for Chinese Application No. 202080104884.9, dated Mar. 28, 2025, with English translation.

Zhang et al., "LASSO based stimulus frequency recognition model for SSVEP BCIs," Biomedical Signal Processing and Control, vol. 7, 2012, pp. 104-111.

* cited by examiner

Irradiation Light

Second Reflected Light

First Reflected Light

Cutting Oil

4

Object

Irradiation Light     Irradiation Light     Irradiation Light

Reflected Light     Reflected Light

A

B

C

Object

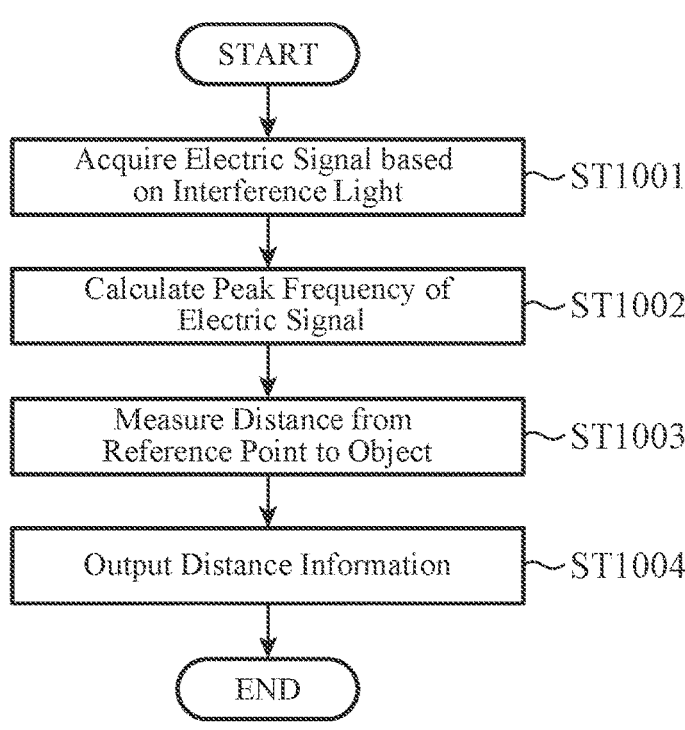

START

Acquire Electric Signal based on Interference Light ~ST1001

Calculate Peak Frequency of Electric Signal ~ST1002

Measure Distance from Reference Point to Object ~ST1003

Output Distance Information ~ST1004

END

FIG. 11

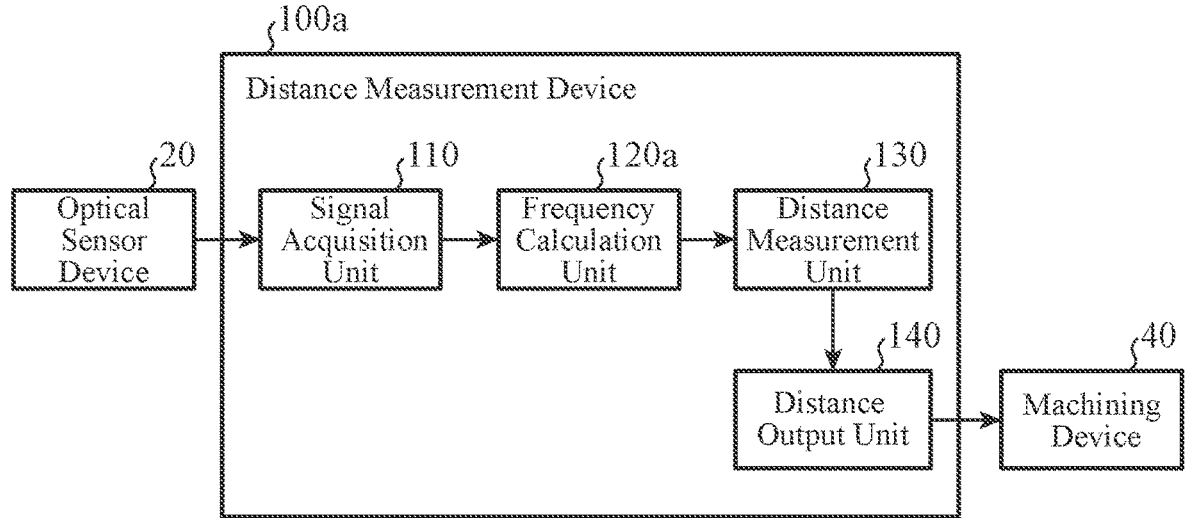

100a

Distance Measurement Device

| 20 | 110 | 120a | 130 |
| Optical Sensor Device | Signal Acquisition Unit | Frequency Calculation Unit | Distance Measurement Unit |

140 — Distance Output Unit

40 — Machining Device

DISTANCE MEASUREMENT DEVICE, DISTANCE MEASUREMENT METHOD, AND MACHINE TOOL

CROSS REFERENCE TO RELATED APPLICATIONS

This application is a Continuation of PCT International Application No. PCT/JP2020/028411, filed on Jul. 22, 2020, all of which is hereby expressly incorporated by reference into the present application.

TECHNICAL FIELD

The present disclosure relates to a distance measurement device, a distance measurement method, and a machine tool.

BACKGROUND ART

There is a technique for measuring a distance from a predetermined reference point to an object to be measured using frequency sweep light.

For example, Patent Literature 1 discloses a technique that, in a machine tool including a machining unit that supplies cutting oil to a work surface of a workpiece and processes the work surface, splits light output from a frequency sweep light source that outputs light having a periodically changing frequency into reference light and irradiation light to be emitted toward a workpiece, irradiates the irradiation light with the workpiece, detects a peak frequency of interference light between reflected light that is the irradiation light reflected by the workpiece and the reference light, and measures a distance from the machine tool to the work surface on the basis of the peak frequency.

The conventional technique described in Patent Literature 1 (hereinafter, simply referred to as "conventional technique"), in a case where cutting oil having a known refractive index is present on a reflecting surface of an object to be measured, acquires, on the basis of first interference light that is interference light between reflected light from a work surface of a workpiece and reference light and second interference light that is interference light between reflected light from the cutting oil and the reference light, a peak frequency of the first interference light and a peak frequency of the second interference light, measures a distance from a machine tool to the work surface.

CITATION LIST

Patent Literature

Patent Literature 1: JP 6576594 B1

SUMMARY OF INVENTION

Technical Problem

In the conventional technique, there is a problem that due to scattering of reflected light reflected by a substance such as cutting oil present on a reflecting surface of an object to be measured, the intensity of the reflected light cannot be sufficiently obtained, and a distance from a predetermined reference point to the object to be measured cannot be accurately measured in some cases. Scattering of the reflected light may occur also in a case where a reflecting surface of an object to be measured is not uniform with respect to an optical axis direction of irradiation light.

Therefore, also in this case, a distance from a predetermined reference point to an object to be measured cannot be accurately measured in some cases.

The present disclosure is intended to solve the above-described problem, and an object of the present disclosure is to provide a distance measurement device capable of accurately measuring a distance from a predetermined reference point to an object to be measured even in a case where the intensity of reflected light reflected by the object to be measured cannot be sufficiently obtained due to scattering of the reflected light.

Solution to Problem

A distance measurement device of the present disclosure includes: processing circuitry to acquire an electric signal based on interference light from an optical sensor device that splits sweep light having a periodically changing frequency into reference light and irradiation light to be emitted toward an object to be measured, irradiates the object to be measured with the irradiation light, generates interference light by causing the reference light to interfere with reflected light that is the irradiation light reflected by the object to be measured, and generates the electric signal based on the generated interference light; to calculate, on the basis of the electric signal based on the acquired interference light, a peak frequency of the electric signal using LASSO regression; to measure, on the basis of the calculated peak frequency, a distance from a predetermined reference point to the object to be measured; and to output distance information indicating the measured distance.

Advantageous Effects of Invention

According to the present disclosure, a distance from a predetermined reference point to an object to be measured can be accurately measured even in a case where the intensity of reflected light reflected by the object to be measured cannot be sufficiently obtained due to scattering of the reflected light.

BRIEF DESCRIPTION OF DRAWINGS

FIG. 10 is a flowchart illustrating an example of processing of the distance measurement device according to the first embodiment.

FIG. 11 is a block diagram illustrating an example of a configuration of a main part of a distance measurement device according to a second embodiment.

DESCRIPTION OF EMBODIMENTS

Hereinafter, embodiments of the present invention will be described in detail with reference to the drawings.

First Embodiment

A distance measurement device 100 according to a first embodiment will be described with reference to FIGS. 1 to 10.

A configuration of a main part of a machine tool 1 to which the distance measurement device 100 according to the first embodiment is applied will be described with reference to FIG. 1.

Figure 1:
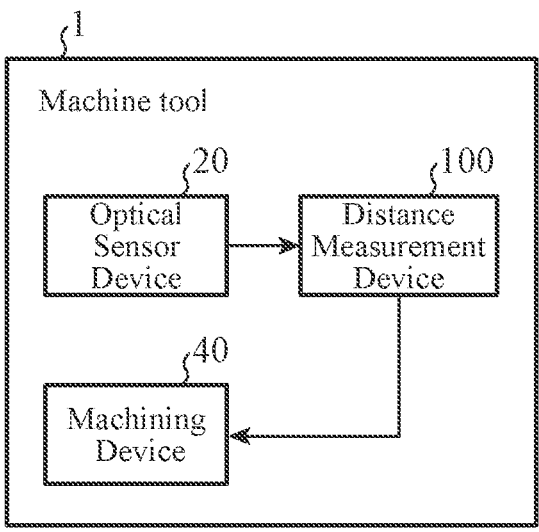
FIG. 1 is a block diagram illustrating an example of a configuration of a main part of a machine tool to which a distance measurement device according to a first embodiment is applied.

FIG. 1 is a block diagram illustrating an example of a configuration of a main part of the machine tool 1 to which the distance measurement device 100 according to the first embodiment is applied.

The machine tool 1 includes an optical sensor device 20, a machining device 40, and the distance measurement device 100.

A configuration of a main part of the optical sensor device 20 included in the machine tool 1 according to the first embodiment will be described with reference to FIG. 2.

Figure 2:
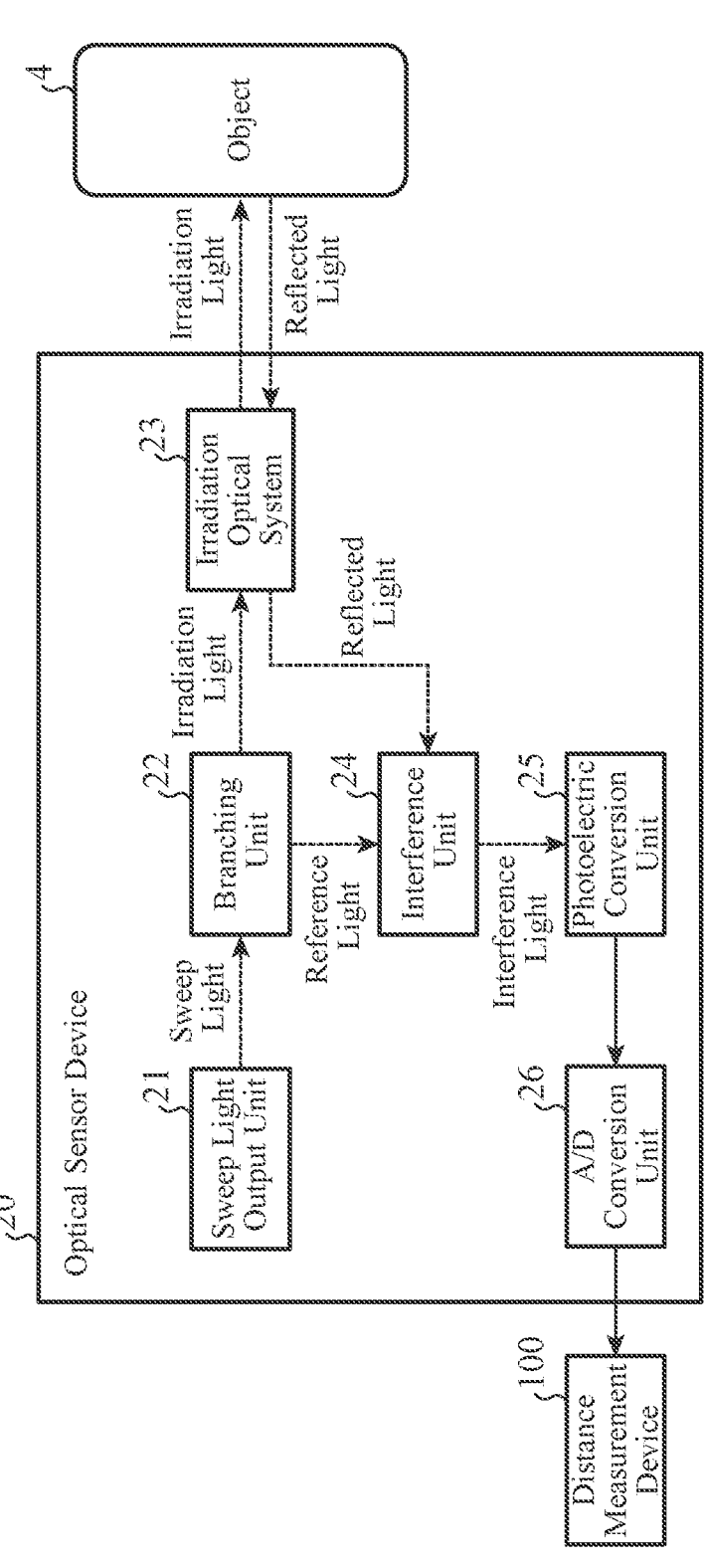
FIG. 2 is a block diagram illustrating an example of a configuration of a main part of an optical sensor device included in a machine tool according to the first embodiment.

FIG. 2 is a block diagram illustrating an example of a configuration of a main part of the optical sensor device 20 included in the machine tool 1 according to the first embodiment.

The optical sensor device 20 includes a sweep light output unit 21, a branching unit 22, an irradiation optical system 23, an interference unit 24, a photoelectric conversion unit 25, and an A/D conversion unit 26.

The sweep light output unit 21 outputs sweep light that is light having a periodically changing frequency. A ratio and period of change in the frequency of the sweep light output from the sweep light output unit 21 are determined in advance. Specifically, for example, the sweep light output unit 21 includes a laser light source, a diffraction grating, and a sweep control unit (not illustrated). A method for generating and outputting sweep light having a periodically changing frequency is a well-known technique, and therefore description thereof will be omitted.

The branching unit 22 splits sweep light output from the sweep light output unit 21 into reference light and irradiation light. The irradiation light is light with which an object 4 to be measured (hereinafter, simply referred to as "object 4") is irradiated. The branching unit 22 includes an optical fiber coupler, a beam splitter, or the like.

The irradiation optical system 23 is an optical system for guiding irradiation light split by the branching unit 22 to the object 4. In addition, the irradiation optical system 23 guides a reflected wave (hereinafter, referred to as "reflected light") that is the irradiation light reflected by the object 4 to the interference unit 24. The irradiation optical system 23 includes one or more transmission type lenses, reflection type lenses, or the like.

The interference unit 24 generates interference light by causing the reflected light and the reference light to interfere with each other. The interference unit 24 includes a half mirror or the like.

The photoelectric conversion unit 25 receives the interference light generated by the interference unit 24 and converts the interference light into an analog electric signal. The photoelectric conversion unit 25 includes a photodiode or the like.

The A/D conversion unit 26 converts the analog electric signal output from the photoelectric conversion unit 25 into a digital electric signal. The A/D conversion unit 26 includes an A/D converter or the like.

The optical sensor device 20 outputs the converted digital electric signal converted by the A/D conversion unit 26.

The distance measurement device 100 receives an electric signal that is a digital electric signal output from the optical sensor device 20, measures a distance from a predetermined reference point to the object 4, and outputs the measured distance as distance information.

Details of the distance measurement device 100 will be described later.

A configuration of a main part of the machining device 40 included in the machine tool 1 according to the first embodiment will be described with reference to FIG. 3.

Figure 3:
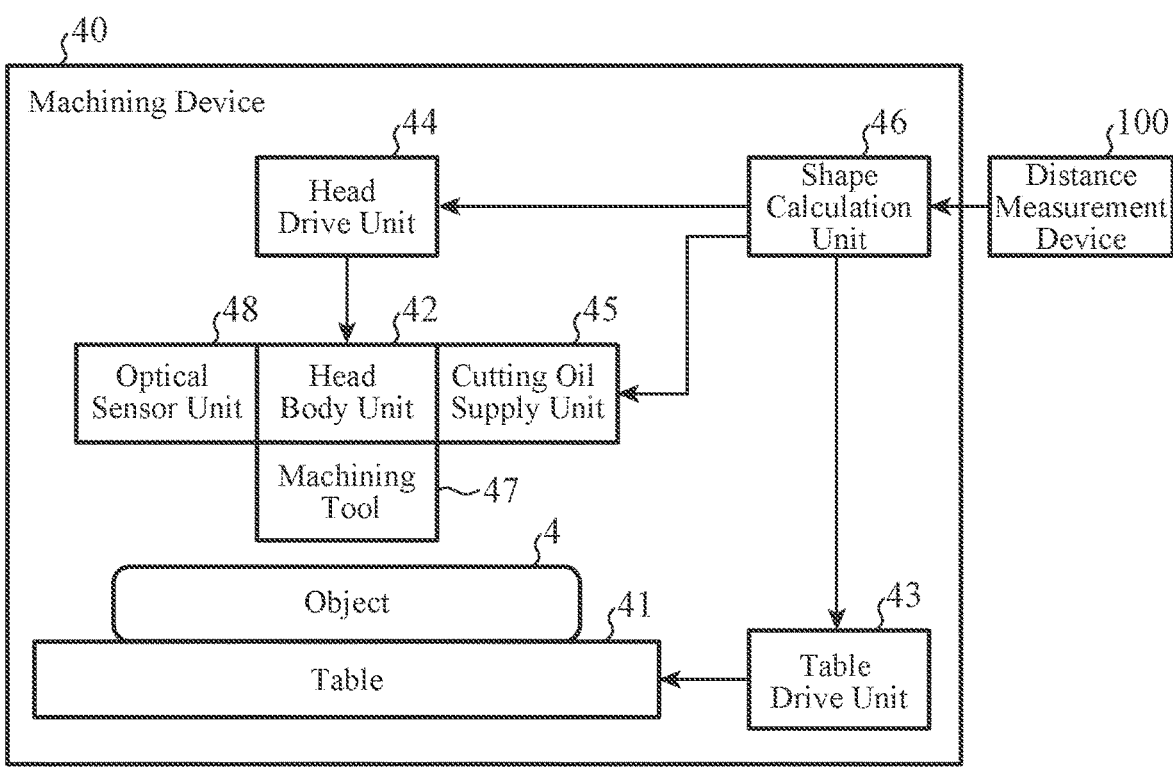
FIG. 3 is a block diagram illustrating an example of a configuration of a main part of a machining device included in the machine tool according to the first embodiment.

FIG. 3 is a block diagram illustrating an example of a configuration of a main part of the machining device 40 included in the machine tool 1 according to the first embodiment.

The machining device 40 includes a table 41, a head body unit 42, a table drive unit 43, a head drive unit 44, a cutting oil supply unit 45, and a shape calculation unit 46.

The table 41 holds the object 4 on the head body unit 42 side thereof.

The head body unit 42 holds a machining tool 47 for, for example, cutting the object 4 on the table 41 side thereof.

In addition, the head body unit 42 holds an optical sensor unit 48 that irradiates the object 4 with irradiation light from the optical sensor device 20 and receives reflected light that is the irradiation light reflected by the object 4. Specifically, for example, the head body unit 42 houses the irradiation optical system 23 included in the optical sensor device 20.

The cutting oil supply unit 45 supplies cutting oil to a work surface of the object 4. For example, the cutting oil supply unit 45 is held by the head body unit 42.

The table drive unit 43 moves the table 41 in a direction parallel or orthogonal to an optical axis of the irradiation light. The table drive unit 43 includes an electric motor or the like.

The head drive unit 44 moves the head body unit 42 in a direction parallel or orthogonal to the optical axis of the irradiation light. The head drive unit 44 includes an electric motor or the like. For example, the cutting oil supply unit 45, the machining tool 47, and the optical sensor unit 48 move in conjunction with the head body unit 42.

The shape calculation unit 46 acquires distance information output from the distance measurement device 100, and calculates the shape of the object 4 on the basis of the acquired distance information.

Specifically, by controlling the table drive unit 43 or the head drive unit 44 and changing an irradiation position of the irradiation light on a work surface of the object 4, the shape calculation unit 46 acquires distance information for each irradiation position from the distance measurement device 100, and calculates the shape of the object 4.

In addition, by controlling the table drive unit 43 or the head drive unit 44 on the basis of the calculated shape of the object 4 and processing information prepared in advance and bringing the machining tool 47 into contact with the work surface of the object 4, the shape calculation unit 46 performs control for processing the work surface of the object 4 into the shape indicated by the processing information.

When the machining tool 47 is caused to cut the work surface of the object 4, the shape calculation unit 46 controls the cutting oil supply unit 45 and causes the cutting oil supply unit 45 to supply cutting oil to the work surface of the object 4.

A configuration of a main part of the distance measurement device 100 according to the first embodiment will be described with reference to FIG. 4.

Figure 4:
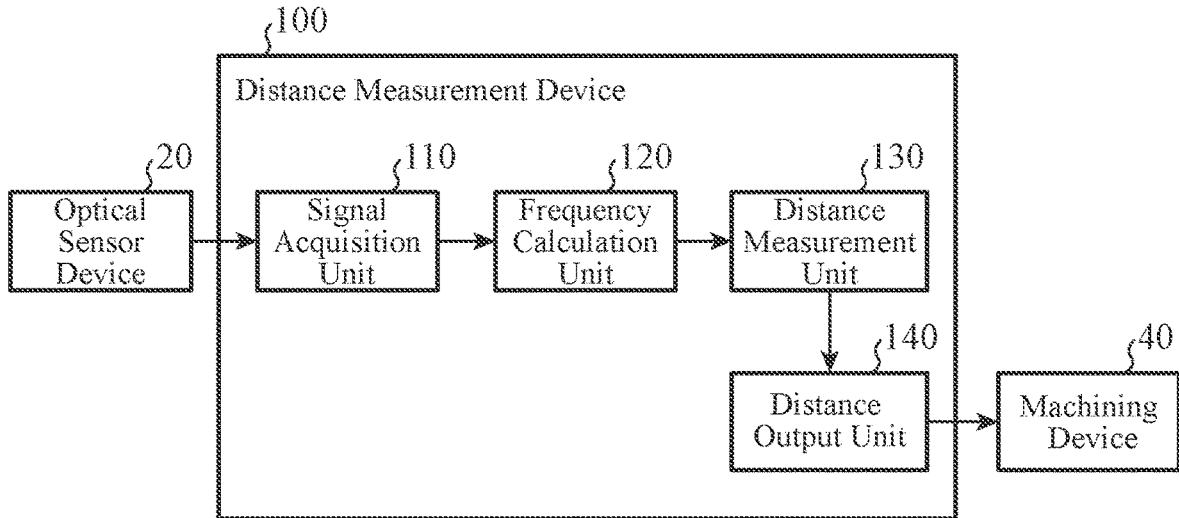
FIG. 4 is a block diagram illustrating an example of a configuration of a main part of the distance measurement device according to the first embodiment.

FIG. 4 is a block diagram illustrating an example of a configuration of a main part of the distance measurement device 100 according to the first embodiment.

The distance measurement device 100 includes a signal acquisition unit 110, a frequency calculation unit 120, a distance measurement unit 130, and a distance output unit 140.

The signal acquisition unit 110 acquires, from the optical sensor device 20, an electric signal based on interference light output from the optical sensor device 20. Specifically, for example, the electric signal acquired by the signal acquisition unit 110 is a digital electric signal.

The distance measurement device 100 may include the A/D conversion unit 26 included in the optical sensor device 20. In a case where the distance measurement device 100 includes the A/D conversion unit 26, the optical sensor device 20 outputs an analog electric signal as an electric signal based on interference light, and the signal acquisition unit 110 acquires the electric signal based on the interference light output from the optical sensor device 20 as an analog electric signal. In the distance measurement device 100, the A/D conversion unit 26 included in the distance measurement device 100 converts the analog electric signal acquired by the signal acquisition unit 110 into a digital electric signal.

The frequency calculation unit 120 calculates, on the basis of the electric signal based on the interference light acquired by the signal acquisition unit 110, a peak frequency of the electric signal using least absolute shrinkage and selection operator (LASSO) regression.

Details of the frequency calculation unit 120 will be described later.

The distance measurement unit 130 measures a distance from a predetermined reference point to the object 4 on the basis of the peak frequency calculated by the frequency calculation unit 120. The predetermined reference point is a surface of the head body unit 42 included in the machining device 40 facing the table 41, the table 41 side end portion of the machining tool 47 held by the head body unit 42, or the like.

Since a method for calculating a distance using a peak frequency by sweep light is a well-known technique, description thereof will be omitted.

The distance output unit 140 outputs distance information indicating the distance measured by the distance measurement unit 130.

Details of the frequency calculation unit 120 will be described.

As described above, the frequency calculation unit 120 calculates, on the basis of the electric signal based on the interference light acquired by the signal acquisition unit 110, a peak frequency of the electric signal using LASSO regression.

The LASSO regression is a power spectrum estimation method by Sparse modeling proposed in Literature 1 described below.

Literature 1: Robert Tibshirani, Journal of the Royal Statistical Society: Series B (Statistical Methodology), 1996, Volume 58, Issue 1.

The LASSO regression is expressed by the following formula (1).

$$\beta_{lasso}=\mathrm{argmin}\{\|y-\mathcal{F}\,\beta\|_2^2+\lambda\|\beta\|_1\} \qquad \text{formula (1)}$$

Here, y is time-series data, and is, for example, data obtained by replacing a digital electric signal with time-series data. In a case where F is a determinant for performing a Fourier transform, the vector $\beta$ is expressed by the following formula (2).

$$\beta=Fy \qquad \text{formula (2)}$$

That is, the vector $\beta$ indicates a power spectrum of y that is time-series data.

$\|y-\mathcal{F}\,\beta\|_2^2$ is a mean value of secondary norms of $y-F\beta$, and is specifically a mean square of elements represented by $y-F\beta$.

$\|\beta\|_1$ is a primary norm of the vector $\beta$, and is a sum of absolute values of elements of the vector $\beta$.

In addition, $\lambda$ is a threshold value.

The power spectrum estimation method by the LASSO regression expressed by formula (1), that is, by the Sparse modeling proposed in Literature 1 estimates the vector $\beta_{lasso}$ that is a power spectrum in which frequency components other than a frequency having the highest intensity are set to 0 using $\lambda$ that is a threshold value.

Specifically, in formula (1), $\lambda\|\beta\|_1$ acts as a penalty term. The peak frequency estimation method by Sparse modeling proposed in Literature 1 estimates the vector $\beta_{lasso}$ that is a power spectrum in which frequency components other than a frequency having the highest intensity are set to 0 by determining $\beta$ having the smallest value of $\|y-\mathcal{F}\,\beta\|_2^2+\lambda\|\beta\|_1$ in a regression manner.

Here, when an appropriate value of $\lambda$ is set among values smaller than the threshold value proposed in Literature 1 by applying formula (1), a value of a penalty term is small. Therefore, it is possible to estimate a power spectrum indicating a value other than 0 not only for the frequency having the highest intensity but also for a frequency having the second highest intensity. In addition, similarly, by setting an appropriate value of $\lambda$ among smaller values, it is possible to estimate a power spectrum indicating a value other than 0 also for a frequency having the third highest intensity.

The frequency calculation unit 120 adjusts a threshold value of a penalty term of the LASSO regression to calculate a predetermined number of peak frequencies of the electric signal based on the interference light using the LASSO regression.

For example, the frequency calculation unit 120 calculates a predetermined number of peak frequencies in descending order of intensity among a plurality of frequency components calculated using the LASSO regression.

A power spectrum of an electric signal estimated using the LASSO regression will be described with reference to FIG. 5A to 5C.

Figures 5A, 5B, 5C:
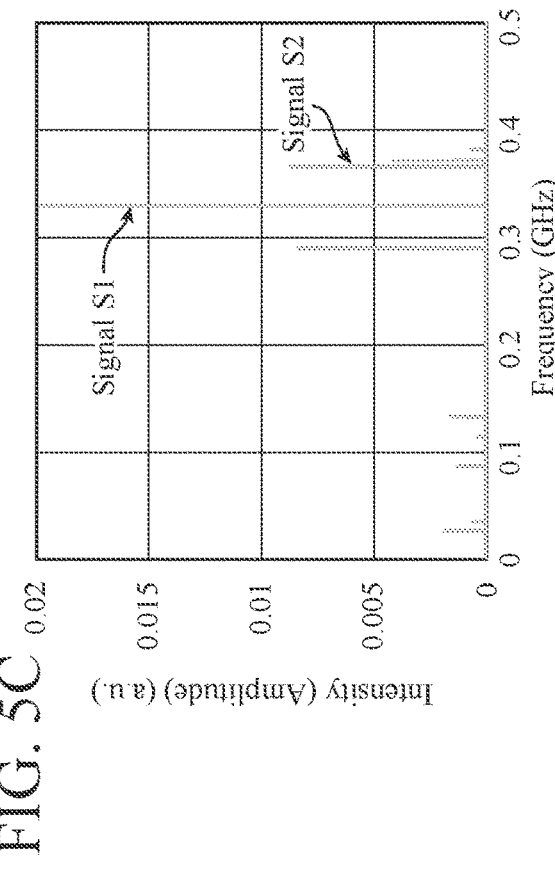
FIG. 5A is an example of a power spectrum of a certain electric signal estimated using a general Fourier transform.
FIG. 5B is an example of a power spectrum estimated using LASSO regression with $\lambda$ of formula (1) as a threshold value for the same electric signal as in FIG. 5A.
FIG. 5C is an example of a power spectrum estimated using LASSO regression in which $\lambda$ is an appropriate value among values smaller than the threshold value by applying formula (1) for the same electric signal as in FIG. 5A.

FIG. 5A is an example of a power spectrum of a certain electric signal estimated using a general Fourier transform.

FIG. 5B is an example of a power spectrum estimated using LASSO regression with λ of formula (1) as a threshold value for the same electric signal as in FIG. 5A.

FIG. 5C is an example of a power spectrum estimated using LASSO regression in which λ is an appropriate value among values smaller than the threshold value by applying formula (1) for the same electric signal as in FIG. 5A.

As illustrated in FIG. 5A, in a case where a power spectrum is estimated using a general Fourier transform, the power spectrum has frequency components at various frequencies, and therefore it is difficult to obtain a frequency having the second highest intensity.

In addition, as illustrated in FIG. 5B, in a case where a power spectrum is estimated using the LASSO regression with λ of formula (1) as a threshold value, frequency components other than a signal S1 having a frequency component with the highest intensity are 0, and therefore a frequency having the second highest intensity cannot be obtained.

On the other hand, as illustrated in FIG. 5C, in a case where a power spectrum is estimated using the LASSO regression in which λ is an appropriate value among values smaller than the threshold value by applying formula (1), not only the signal S1 having a frequency component with the highest intensity but also a signal S2 having a frequency component with the second highest intensity can be specified.

By adjusting λ to an appropriate value among values smaller than the threshold value, the frequency calculation unit 120 estimates the power spectrum illustrated in FIG. 5C, and calculates the frequencies of the two signals S1 and S2 having high intensities among the frequency components of the estimated power spectrum as peak frequencies.

The distance measurement unit 130 measures a distance from a predetermined reference point to the object 4 on the basis of the two peak frequencies calculated by the frequency calculation unit 120.

Reflected light in a case where cutting oil is present on a work surface of the object 4 will be described with reference to FIG. 6.

Figure 6:
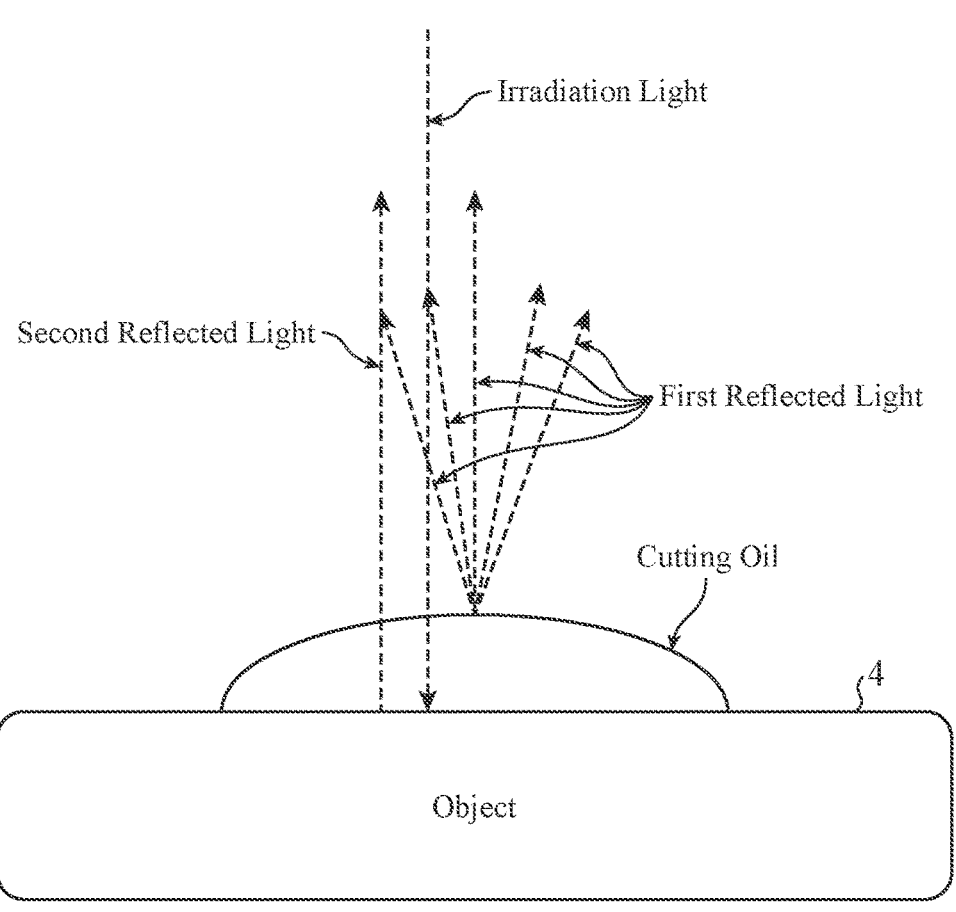
FIG. 6 is an explanatory diagram illustrating an example of reflected light in a case where cutting oil is present on a work surface of an object.

FIG. 6 is an explanatory diagram illustrating an example of reflected light in a case where cutting oil is present on the work surface of the object 4.

As illustrated in FIG. 6, a part of irradiation light emitted toward the object 4 is reflected by an oil surface of the cutting oil. The rest of the irradiation light passes through the cutting oil and is reflected by the work surface of the object 4. First reflected that is the irradiation light reflected by the oil surface of the cutting oil, is scattered, and therefore only a part of the first reflected light is directed to the irradiation optical system 23 illustrated in FIG. 2. Therefore, among electric signals acquired by the distance measurement device 100, the intensity of an electric signal caused by the first reflected light is smaller than the intensity of an electric signal caused by the second reflected light that is the irradiation light reflected by the work surface of the object 4. Therefore, the electric signal caused by the first reflected light included in the electric signals acquired by the distance measurement device 100 may be mixed in white noise.

That is, in a case where cutting oil is present on the work surface of the object 4, a power spectrum estimated using a general Fourier transform for an electric signal acquired by the distance measurement device 100 may be in a state as illustrated in FIG. 5A.

In a case where cutting oil is present on the work surface of the object 4, a power spectrum as illustrated in FIG. 5A may be obtained, and therefore the distance measurement unit 130 cannot measure a distance from a predetermined reference point to an oil surface of the cutting oil present on the work surface of the object 4. Since the cutting oil has a refractive index different from that of air or vacuum, as a result, the distance measurement unit 130 cannot accurately measure a distance from a predetermined reference point to the work surface of the object 4.

However, by estimating a power spectrum using the LASSO regression in which λ is adjusted to an appropriate value among values smaller than the threshold value by applying formula (1) for a similar electric signal, the estimated power spectrum is in a state as illustrated in FIG. 5C, and a frequency component of reflected light reflected by the oil surface of the cutting oil can be specified as the signal S2.

Therefore, the distance measurement unit 130 can measure a distance from a predetermined reference point to the oil surface of the cutting oil present on the work surface of the object 4, and as a result, the distance measurement unit 130 can accurately measure a distance from the predetermined reference point to the work surface of the object 4.

With the above configuration, the distance measurement device 100 can accurately measure a distance from a predetermined reference point to the object 4 to be measured even in a case where the intensity of reflected light reflected by the object 4 to be measured cannot be sufficiently obtained due to scattering of the reflected light.

Reflected light in a case where a work surface of the object 4 is not uniform with respect to an optical axis direction of irradiation light will be described with reference to FIGS. 7 and 8A and 8B.

Figure 7:
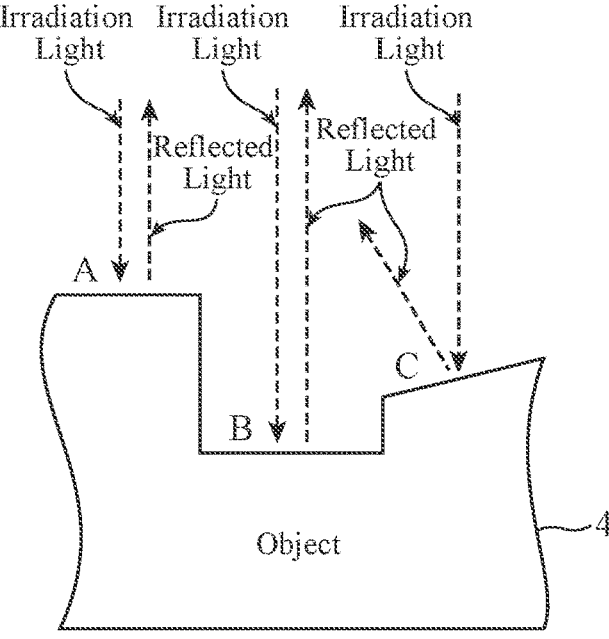
FIG. 7 is an explanatory diagram illustrating an example of reflected light in a case where a work surface of an object is not uniform with respect to an optical axis direction of irradiation light.

FIG. 7 is an explanatory diagram illustrating an example of reflected light in a case where a work surface of the object 4 is not uniform with respect to an optical axis direction of irradiation light.

As illustrated in FIG. 7, irradiation light emitted toward the object 4 is reflected by each of surfaces A. B, and C included in the work surface of the object 4. Since the surface A or the surface B is uniform with respect to an optical axis direction of the irradiation light, reflected light reflected by the surface A or the surface B is directed to the irradiation optical system 23 illustrated in FIG. 2. On the other hand, since the surface C is not uniform with respect to the optical axis direction of the irradiation light, reflected light reflected by the surface C is scattered, and only a part of the reflected light is directed to the irradiation optical system 23 illustrated in FIG. 2.

Figure 8A:
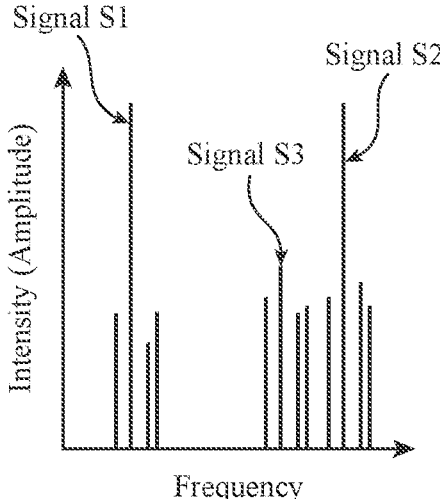
FIG. 8A is an example of a power spectrum estimated using a general Fourier transform for an electric signal based on the reflected light reflected by the work surface of the object illustrated in FIG. 7.

FIG. 8A is an example of a power spectrum estimated using a general Fourier transform for an electric signal based on the reflected light reflected by the work surface of the object 4 illustrated in FIG. 7.

Figure 8B:
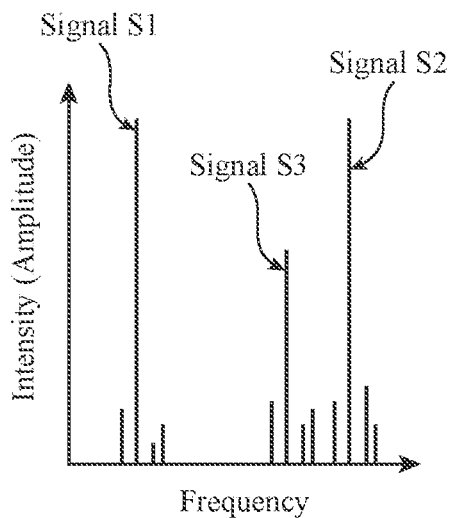
FIG. 8B is an example of a power spectrum estimated using LASSO regression in which λ is an appropriate value among values smaller than the threshold value by applying formula (1) for the same electric signal as in FIG. 8A.

FIG. 8B is an example of a power spectrum estimated using the LASSO regression in which λ is an appropriate value among values smaller than the threshold value by applying formula (1) for the same electric signal as in FIG. 8A.

For an electric signal based on the reflected light reflected by the work surface of the object 4 illustrated in FIG. 7, the intensity of an electric signal caused by the reflected light reflected by the surface C is smaller than the intensity of an electric signal caused by the reflected light reflected by the surface A or the surface B. Therefore, as illustrated in FIG. 8A, there is a case where a signal S3 corresponding to the electric signal caused by the reflected light reflected by the surface C included in the electric signals acquired by distance measurement device 100 is blended into white noise, a frequency component caused by reflected light reflected by a surface other than the surface C in the work surface of the object 4, or the like.

On the other hand, as illustrated in FIG. 8B, in a case where a power spectrum is estimated using the LASSO regression in which λ is adjusted to an appropriate value among values smaller than the threshold value by applying formula (1), not only the signal S1 corresponding to the reflected light reflected by the surface A and the signal S2 corresponding to the reflected light reflected by the surface B but also the signal S3 corresponding to the reflected light reflected by the surface C having a frequency component with the third highest intensity can be specified.

Therefore, the distance measurement unit 130 can measure a distance from a predetermined reference point to each of the surfaces A. B, and C included in the work surface of the object 4, and as a result, the distance measurement unit 130 can accurately measure a distance from the predetermined reference point to the work surface of the object 4.

With the above configuration, the distance measurement device 100 can accurately measure a distance from a predetermined reference point to the object 4 to be measured even in a case where the intensity of reflected light reflected by the object 4 to be measured cannot be sufficiently obtained due to scattering of the reflected light, such as in a case where a work surface of the object 4 is not uniform with respect to an optical axis direction of irradiation light.

A hardware configuration of a main part of the distance measurement device 100 according to the first embodiment will be described with reference to FIGS. 9A and 9B.

Figure 9A:
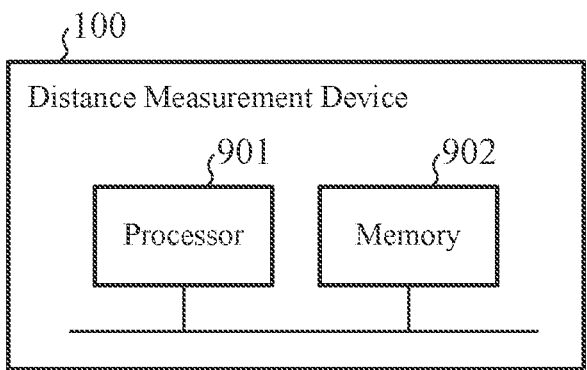
FIGS. 9A and 9B are block diagrams illustrating examples of a hardware configuration of the distance measurement device according to the first embodiment.
Figure 9B:
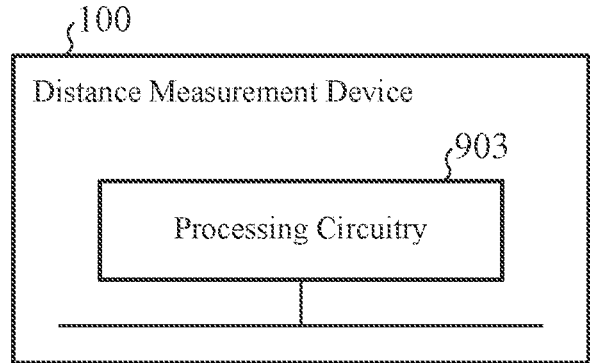

FIGS. 9A and 9B are block diagrams illustrating examples of a hardware configuration of the distance measurement device 100 according to the first embodiment.

As illustrated in FIG. 9A, the distance measurement device 100 includes a computer, and the computer includes a processor 901 and a memory 902. The memory 902 stores a program for causing the computer to function as the signal acquisition unit 110, the frequency calculation unit 120, the distance measurement unit 130, and the distance output unit 140. The processor 901 reads and executes the program stored in the memory 902, and the functions of the signal acquisition unit 110, the frequency calculation unit 120, the distance measurement unit 130, and the distance output unit 140 are thereby implemented.

In addition, as illustrated in FIG. 9B, the distance measurement device 100 may include a processing circuitry 903. In this case, the functions of the signal acquisition unit 110, the frequency calculation unit 120, the distance measurement unit 130, and the distance output unit 140 may be implemented by the processing circuitry 903.

In addition, the distance measurement device 100 may include the processor 901, the memory 902, and the processing circuitry 903 (not illustrated). In this case, some of the functions of the signal acquisition unit 110, the frequency calculation unit 120, the distance measurement unit 130, and the distance output unit 140 may be implemented by the processor 901 and the memory 902, and the remaining functions may be implemented by the processing circuitry 903.

The processor 901 uses, for example, a central processing unit (CPU), a graphics processing unit (GPU), a microprocessor, a microcontroller, or a digital signal processor (DSP).

The memory 902 uses, for example, a semiconductor memory or a magnetic disk. More specifically, the memory 902 uses a random access memory (RAM), a read only memory (ROM), a flash memory, an erasable programmable read only memory (EPROM), an electrically erasable programmable read-only memory (EEPROM), a solid state drive (SSD), a hard disk drive (HDD), or the like.

The processing circuitry 903 uses, for example, an application specific integrated circuit (ASIC), a programmable logic device (PLD), a field-programmable gate array (FPGA), a system-on-a-chip (SoC), or a system large-scale integration (LSI).

An operation of the distance measurement device 100 according to the first embodiment will be described with reference to FIG. 10.

FIG. 10 is a flowchart illustrating an example of processing of the distance measurement device 100 according to the first embodiment.

For example, the distance measurement device 100 repeatedly executes the processing of the flowchart.

First, in step ST1001, the signal acquisition unit 110 acquires an electric signal based on interference light from the optical sensor device 20.

Next, in step ST1002, the frequency calculation unit 120 calculates a peak frequency of the electric signal based on the interference light using the LASSO regression.

Next, in step ST1003, the distance measurement unit 130 measures a distance from a predetermined reference point to the object 4.

Next, in step ST1004, the distance output unit 140 outputs distance information.

After step ST1004, the distance measurement device 100 ends the processing of the flowchart. After ending the processing of the flowchart, the distance measurement device 100 returns to step ST1001, and repeatedly executes the processing of the flowchart.

As described above, the distance measurement device 100 according to the first embodiment includes: the signal acquisition unit 110 to acquire an electric signal based on interference light from the optical sensor device 20 that splits sweep light having a periodically changing frequency into reference light and irradiation light to be emitted toward the object 4 to be measured, irradiates the object 4 to be measured with the irradiation light, generates interference light by causing the reference light to interfere with reflected light that is the irradiation light reflected by the object 4 to be measured, and generates the electric signal based on the generated interference light; the frequency calculation unit 120 to calculate, on the basis of the electric signal based on the interference light acquired by the signal acquisition unit 110, a peak frequency of the electric signal using the LASSO regression; the distance measurement unit 130 to measure, on the basis of the peak frequency calculated by the frequency calculation unit 120, a distance from a predetermined reference point to the object 4 to be measured; and the distance output unit 140 to output distance information indicating the distance measured by the distance measurement unit 130.

With the above configuration, the distance measurement device 100 can accurately measure a distance from a predetermined reference point to the object 4 to be measured even in a case where the intensity of reflected light reflected by the object 4 to be measured cannot be sufficiently obtained due to scattering of the reflected light.

In addition, as described above, in the distance measurement device 100 according to the first embodiment, in the above-described configuration, the frequency calculation unit 120 adjusts a threshold value of a penalty term of the LASSO regression to calculate a predetermined number of peak frequencies of an electric signal based on interference light using the LASSO regression.

With the above configuration, the distance measurement device 100 can calculate a peak frequency of an electric signal based on reflected light reflected by the object 4 to be measured even in a case where the intensity of the reflected light cannot be sufficiently obtained due to scattering of the reflected light. As a result, the distance measurement device 100 can accurately measure a distance from a predetermined reference point to the object 4 to be measured.

In addition, as described above, in the distance measurement device 100 according to the first embodiment, in the above-described configuration, the frequency calculation unit 120 calculates a predetermined number of peak frequencies of an electric signal based on interference light using the LASSO regression and calculates a predetermined number of peak frequencies in descending order of intensity among a plurality of frequency components calculated using the LASSO regression.

With the above configuration, the distance measurement device 100 can calculate a peak frequency of an electric signal based on reflected light reflected by the object 4 to be measured even in a case where the intensity of the reflected light cannot be sufficiently obtained due to scattering of the reflected light. As a result, the distance measurement device 100 can accurately measure a distance from a predetermined reference point to the object 4 to be measured.

In addition, as described above, in the distance measurement device 100 according to the first embodiment, in the above-described configuration, the frequency calculation unit 120 calculates a predetermined number of peak frequencies of an electric signal based on interference light using the LASSO regression, and the distance measurement unit 130 measures a distance from a predetermined reference point to the object 4 to be measured on the basis of a predetermined number of peak frequencies calculated by the frequency calculation unit 120.

With the above configuration, the distance measurement device 100 can calculate a peak frequency of an electric signal based on reflected light reflected by the object 4 to be measured even in a case where the intensity of the reflected light cannot be sufficiently obtained due to scattering of the reflected light. As a result, the distance measurement device 100 can accurately measure a distance from a predetermined reference point to the object 4 to be measured.

In addition, as described above, the machine tool 1 according to the first embodiment includes the distance measurement device 100 and the shape calculation unit 46 that calculates the shape of the object 4 to be measured on the basis of distance information output from the distance measurement device 100 in the above-described configuration.

With the above configuration, since the distance measurement device 100 outputs distance information indicating an accurate distance from a predetermined reference point to the object 4 to be measured even in a case where the intensity of reflected light reflected by the object 4 to be measured cannot be sufficiently obtained due to scattering of the reflected light, the machine tool 1 can accurately calculate the shape of the object 4 to be measured.

Second Embodiment

A distance measurement device 100a according to a second embodiment will be described with reference to FIGS. 11 to 13.

A configuration of a main part of the distance measurement device 100a according to the second embodiment will be described with reference to FIG. 11.

FIG. 11 is a block diagram illustrating an example of a configuration of a main part of the distance measurement device 100a according to the second embodiment.

The distance measurement device 100a includes a signal acquisition unit 110, a frequency calculation unit 120a, a distance measurement unit 130, and a distance output unit 140.

The distance measurement device 100a is obtained by changing the frequency calculation unit 120 included in the distance measurement device 100 according to the first embodiment to the frequency calculation unit 120a.

In the configuration of the distance measurement device 100a, description of a configuration similar to that of the distance measurement device 100 according to the first embodiment will be omitted. That is, in FIG. 11, the same reference numerals are given to blocks similar to those illustrated in FIG. 4, and description thereof will be omitted.

Note that the distance measurement device 100a is applied to, for example, a machine tool 1 similarly to the distance measurement device 100 according to the first embodiment.

The frequency calculation unit 120 included in the distance measurement device 100 according to the first embodiment calculates, on the basis of an electric signal based on interference light acquired by the signal acquisition unit 110, a peak frequency of the electric signal using LASSO regression.

On the other hand, the frequency calculation unit 120a calculates a predetermined number of peak frequencies of an electric signal based on interference light, and calculates the predetermined number of peak frequencies on the basis of a plurality of frequency components calculated using the LASSO regression and a plurality of frequency components calculated using a Fourier transform.

Specifically, for example, by calculating, for each frequency, a product of each frequency component calculated using the LASSO regression and each frequency component calculated using a Fourier transform corresponding to each frequency component calculated using the LASSO regression, the frequency calculation unit 120a determines a vector $\beta_H$. For example, by multiplying amplitude values of the same frequency by each other between each frequency component of the power spectrum illustrated in FIG. 5A and each frequency component of the power spectrum illustrated in FIG. 5C, the frequency calculation unit 120a determines the vector $\beta_H$.

Each element of the vector $\beta_H$ determined by the frequency calculation unit 120a corresponds to a frequency component of an electric signal based on interference light.

The frequency calculation unit 120a selects a predetermined number of elements in descending order of element value from among a plurality of elements of the determined vector $\beta_H$ and calculates the selected elements as peak frequencies.

Figure 12:
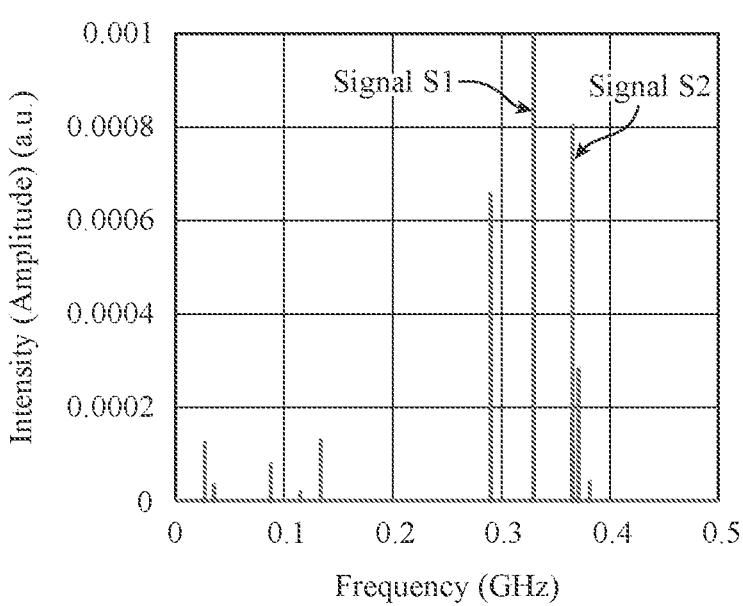
FIG. 12 is an explanatory diagram illustrating an example of a vector PH determined by a frequency calculation unit according to the second embodiment.

FIG. 12 is an explanatory diagram illustrating an example of the vector $\beta_H$ determined by the frequency calculation unit 120a according to the second embodiment.

The horizontal axis in FIG. 12 is similar to the frequency of the power spectrum illustrated in FIG. 5A or 5C.

A value of the amplitude in a signal S2 of the power spectrum illustrated in FIG. 5C is close to values of the amplitudes of the other frequencies, whereas a value of an element corresponding to the frequency of a signal S2 in the vector $\beta_H$ illustrated in FIG. 12 is more clearly different from values of elements at the other frequencies.

That is, the frequency calculation unit 120a can calculate a peak frequency on the basis of the vector $\beta_H$ having a larger signal-to-noise ratio than the power spectrum illustrated in FIG. 5C.

As a result, the distance measurement device 100a can more accurately measure a distance from a predetermined reference point to the object 4 to be measured than the distance measurement device 100 according to the first embodiment.

Since a hardware configuration of a main part of the distance measurement device 100a is similar to that described with reference to FIGS. 9A and 9B in the first embodiment, illustration thereof and description thereof will be omitted. That is, the functions of the signal acquisition unit 110, the frequency calculation unit 120a, the distance measurement unit 130, and the distance output unit 140 may be implemented by the processor 901 and the memory 902, or may be implemented by the processing circuitry 903.

An operation of the distance measurement device 100a according to the second embodiment will be described with reference to FIG. 13.

Figure 13:
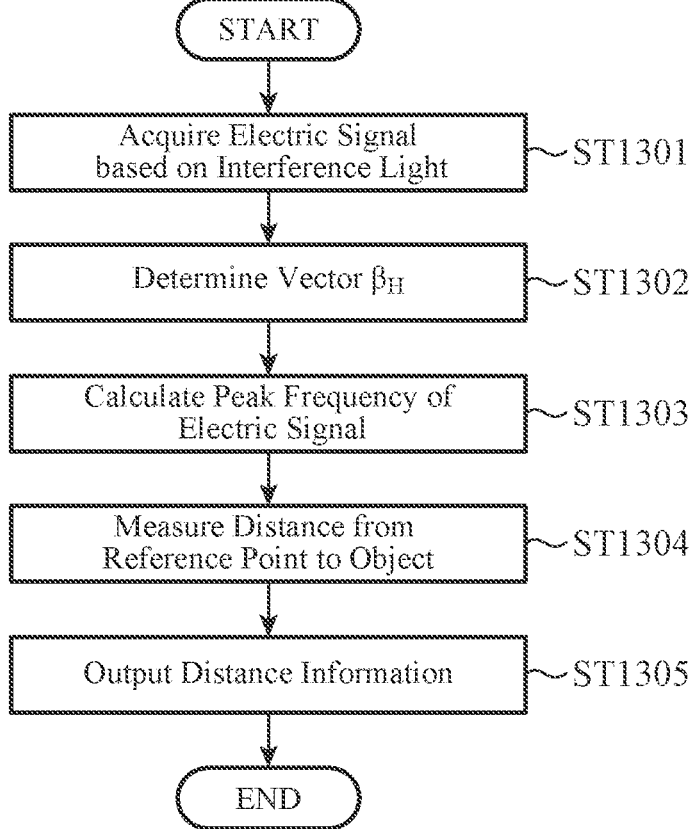
FIG. 13 is a flowchart illustrating an example of processing of the distance measurement device according to the second embodiment.

FIG. 13 is a flowchart illustrating an example of processing of the distance measurement device 100a according to the second embodiment.

For example, the distance measurement device 100a repeatedly executes the processing of the flowchart.

First, in step ST1301, the signal acquisition unit 110 acquires an electric signal based on interference light from the optical sensor device 20.

Next, in step ST1302, the frequency calculation unit 120a determines a vector $\beta_H$ on the basis of a plurality of frequency components calculated using the LASSO regression and a plurality of frequency components calculated using a Fourier transform.

Next, in step ST1303, the frequency calculation unit 120a calculates a peak frequency of an electric signal based on interference light on the basis of the vector $\beta_H$.

Next, in step ST1304, the distance measurement unit 130 measures a distance from a predetermined reference point to the object 4.

Next, in step ST1305, the distance output unit 140 outputs distance information.

After step ST1304, the distance measurement device 100a ends the processing of the flowchart. After ending the processing of the flowchart, the distance measurement device 100a returns to step ST1301, and repeatedly executes the processing of the flowchart.

As described above, the distance measurement device 100a according to the second embodiment includes: the signal acquisition unit 110 that acquires an electric signal based on interference light from the optical sensor device 20 that splits sweep light having a periodically changing frequency into reference light and irradiation light to be emitted toward the object 4 to be measured, irradiates the object to be measured with the irradiation light, generates interference light by causing the reference light to interfere with reflected light that is the irradiation light reflected by the object 4 to be measured, and generates the electric signal based on the generated interference light; the frequency calculation unit 120a to calculate, on the basis of the electric signal based on the interference light acquired by the signal acquisition unit 110, a peak frequency of the electric signal using the LASSO regression; the distance measurement unit 130 to measure, on the basis of the peak frequency calculated by the frequency calculation unit 120a, a distance from a predetermined reference point to the object 4 to be measured; and the distance output unit 140 to output distance information indicating the distance measured by the distance measurement unit 130, wherein the frequency calculation unit 120a calculates a predetermined number of peak frequencies of an electric signal based on interference light, and calculates the predetermined number of peak frequencies on the basis of a plurality of frequency components calculated using the LASSO regression and a plurality of frequency components calculated using a Fourier transform.

With the above configuration, the distance measurement device 100a can accurately measure a distance from a predetermined reference point to the object 4 to be measured even in a case where the intensity of reflected light reflected by the object 4 to be measured cannot be sufficiently obtained due to scattering of the reflected light.

Note that in the present disclosure, it is possible to freely combine the embodiments to each other, modify any constituent element in each of the embodiments, or omit any constituent element in each of the embodiments within the scope of the disclosure.

INDUSTRIAL APPLICABILITY

The distance measurement device of the present disclosure can be applied to a machine tool.

REFERENCE SIGNS LIST

1: Machine tool, 4: Object, 20: Optical sensor device, 21: Sweep light output unit, 22: Branching unit, 23: Irradiation optical system, 24: Interference unit, 25: Photoelectric conversion unit, 26: A/D conversion unit, 40: Machining device, 41: Table, 42: Head body unit, 43: Table drive unit, 44: Head drive unit, 45: Cutting oil supply unit, 46: Shape calculation unit, 47: Machining tool, 48: Optical sensor unit, 100 and 100a: Distance measurement device, 110: Signal acquisition unit, 120 and 120a: Frequency calculation unit, 130: Distance measurement unit, 140: Distance output unit, 901: Processor, 902: Memory, 903: Processing circuitry

What is claimed is:

1. An apparatus comprising:

an optical sensor device to split sweep light having a periodically changing frequency into reference light and irradiation light to be emitted toward an object to be measured, to irradiate the object to be measured with the irradiation light, to generate interference light by causing the reference light to interfere with reflected light that is the irradiation light reflected by the object to be measured, and to generate an electric signal based on the generated interference light; and processing circuitry to receive the electric signal, to calculate, on a basis of the electric signal based on the acquired interference light, a peak frequency of the electric signal using LASSO regression, to determine, on a basis of the calculated peak frequency, a distance from a predetermined reference point to the object to be measured; and to output distance information indicating the determined distance.

2. The apparatus according to claim 1, wherein the processing circuitry adjusts a threshold value of a penalty term of the LASSO regression to calculate a predetermined number of the peak frequencies of the electric signal based on the interference light using the LASSO regression.

3. The apparatus according to claim 1, wherein the processing circuitry calculates a predetermined number of the peak frequencies of the electric signal based on the interference light using the LASSO regression, and calculates the predetermined number of peak frequencies in descending order of intensity among a plurality of frequency components calculated using the LASSO regression.

4. The apparatus according to claim 1, wherein the processing circuitry calculates a predetermined number of the peak frequencies of the electric signal based on the interference light using the LASSO regression, and determines a distance from a predetermined reference point to the object to be measured on a basis of the predetermined number of calculated peak frequencies.

5. The apparatus according to claim 1, wherein the processing circuitry calculates a predetermined number of the peak frequencies of the electric signal based on the interference light, and calculates the predetermined number of peak frequencies on a basis of a plurality of frequency components calculated using the LASSO regression and a plurality of frequency components calculated using a Fourier transform.

6. A machine tool comprising:

the apparatus according to claim 1; and a shape calculator to calculate a shape of the object to be measured on a basis of the distance information output from the processing circuitry.

7. A distance measurement method comprising:

using an optical sensor device to split sweep light having a periodically changing frequency into reference light and irradiation light to be emitted toward an object to be measured, irradiate the object to be measured with the irradiation light, generate interference light by causing the reference light to interfere with reflected light that is the irradiation light reflected by the object to be measured, and generate the electric signal based on the generated interference light; and using processing circuitry to calculate, on a basis of the electric signal based on the acquired interference light, a peak frequency of the electric signal using LASSO regression, determine, on a basis of the calculated peak frequency, a distance from a predetermined reference point to the object to be measured; and outputting distance information indicating the measured distance.

* * * * *